United States Patent
Czimmek et al.

(10) Patent No.: US 11,349,341 B2
(45) Date of Patent: May 31, 2022

(54) DYNAMIC TUNING USING REACTIVE VOLTAGES ON A SERIES RESONATOR

(71) Applicant: Vitesco Technologies USA, LLC, Auburn Hills, MI (US)

(72) Inventors: Perry Robert Czimmek, Williamsburg, VA (US); Willem Nicolaas Van Vuuren, Yorktown, VA (US); Douglas Edward Cosby, Newport News, VA (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 16/691,819

(22) Filed: Nov. 22, 2019

(65) Prior Publication Data
US 2021/0159733 A1   May 27, 2021

(51) Int. Cl.
| | |
|---|---|
| *H02J 50/12* | (2016.01) |
| *H02J 7/04* | (2006.01) |
| *H04B 5/00* | (2006.01) |
| *B60L 50/00* | (2019.01) |

(52) U.S. Cl.
CPC .............. *H02J 50/12* (2016.02); *B60L 50/00* (2019.02); *H02J 7/04* (2013.01); *H04B 5/0037* (2013.01); *H04B 5/0081* (2013.01)

(58) Field of Classification Search
CPC .... H02J 50/10; H02J 50/12; H02J 7/00; H02J 7/04; B60L 50/00; H04B 5/00; H04B 5/0037; H04B 5/0075; H04B 5/0081
USPC ....................................................... 307/104
See application file for complete search history.

(56) References Cited

U.S. PATENT DOCUMENTS

| | | | |
|---|---|---|---|
| 2017/0117755 A1* | 4/2017 | Muratov | H02J 50/10 |
| 2017/0117756 A1* | 4/2017 | Muratov | H02J 7/025 |
| 2020/0070681 A1* | 3/2020 | Niwa | B60L 53/66 |

* cited by examiner

*Primary Examiner* — Hal Kaplan (57) ABSTRACT

A wireless power transmission method of control is disclosed where equalization of the reactive voltages of a series resonant circuit, which is part of a transmitter antenna tuning and coupling unit, is obtained by adjusting the switching frequency and thereby used to determine a switching frequency of the driving high frequency inverter. By measuring and largely equalizing the voltage parameters of the series resonant circuit to establish an inverter switching frequency, improved efficiency of the wireless power transmission method.

18 Claims, 5 Drawing Sheets

DYNAMIC TUNING USING REACTIVE VOLTAGES ON A SERIES RESONATOR

FIELD OF THE INVENTION

The present invention relates generally to automotive electrification, electric vehicles, the transfer of electrical power to vehicles, and wireless power transfer.

BACKGROUND

The inevitable conversion of mobility from internal combustion engine propulsion to electric motor propulsion provides an environment of growing need for enabling technologies for this conversion. Vehicle weights, driving habits and consumer expectations bound the need such that the electric vehicles mimic the performance and convenience of existing internal combustion engine propelled vehicles. This boundary requires that the energy contained within the vehicle is able to satisfy the need. In the case of the internal combustion engine, this is usually in the form of some element of fuel storage or fuel tank. The analog of the fuel tank for the electric vehicle would be in any number of electrical energy storage schemes, including but not limited to elements such as batteries, capacitors or kinetic energy storage fly-wheels.

The convenience of available fuels and fuel transfer infrastructure to resupply the vehicle fuel tank with energy has allowed for the internal combustion engine to be the dominant propulsion mode for decades throughout the world. In order to support the conversion of mobility, electrified vehicles would need their energy storage elements replenished by a convenient and widespread method. One method may be the mechanical connection of electrical conduits, such as buss, wire or cable to the vehicle for electrical energy transfer from the power grid. This would require some kind of connector mechanism that has low electrical resistance to minimize Ohmic heating and power loss. The connection would have to be maintained over a useful lifetime spanning years. Tribological wear of the electrical connection, as well as electrical arcing, galvanic oxidation and general fatigue and repetitive handling will inevitably degrade this mechanical connection of electrical conduits. Another method may be the contactless transfer of electrical energy via electromagnetic fields, eliminating the aforementioned degradation. As there is no direct mechanical connection, this is often termed "Wireless" Power Transfer (WPT). Unlike the mechanical connection, which can transfer electrical energy as a direct current or a low frequency alternating current, WPT by convention is accomplished with a high frequency alternating current. As it is known that a time varying field will induce energy from a transmitter to a receiver over empty space. The high frequency also has the advantage that the transfer of energy can be obtained with a relatively small antenna over great distance, as is done with radio and television broadcasting.

The generation and wireless transmission of the high frequency energy from readily available municipal or "grid" alternating current frequency sources, and at high enough power levels to transfer energy into the electric vehicle energy storage element in a convenient amount of time, creates a further need for methods and technology that can accomplish this.

SUMMARY

Example embodiments fulfill the need referred to above by improving and/or optimizing the switching frequency of a resonant wireless power transfer circuit in order to improve and/or optimize power transfer to a load. In an example embodiment, the resonant circuit is a series resonant circuit which includes a capacitor and an inductor. The reactive voltage across the capacitive reactance is balanced with the reactive voltage across the inductive reactance. This balance can be a form of equalization or near equalization of the voltages.

In order to accomplish this, the voltages across each of the reactive components forming the series resonator are measured or sampled to provide voltage values and the switching frequency of an inverter is adjusted such that voltage values, whether peak, mean or rectified, or some other values, are equalized or near equalized. This equalization indicates the resonant frequency of the series resonator is obtained. The resonant frequency is then maintained by maintaining the equality of the voltage values through adjustment of the inverter switching frequency.

According to an example embodiment, a wireless power transfer system includes an inverter having a pair of supply inputs for coupling to a power supply and one or more control inputs for receiving one or more control signals. The inverter includes a resonant circuit having a resonant capacitor and a resonant inductor, and a switching circuit coupled to the supply inputs and the one or more control inputs for providing an alternating current to the resonant circuit. A receiver includes an inductor which forms inductive coupling with the resonant inductor of the resonant circuit and a rectifier connected to the inductor of the receiver. The receiver rectifies an AC signal to generate a DC output voltage at an output of the wireless power transfer system. A controller has one or more inputs which receive one or more signals corresponding to one or more electrical parameters of the resonant circuit and one or more outputs connected to the one or more control inputs of the inverter for providing the one or more control signals to the switching circuit of the inverter. The controller is configured to generate the one or more control signals, the one or more control signals controlling a switching frequency of the inverter based at least in part upon the one or more electrical parameters of the resonant circuit so that a voltage across the resonant capacitor and a voltage across the resonant inductor are maintained within a predetermined voltage range of each other.

The resonant circuit includes a series resonant circuit, the resonant capacitor and the resonant inductor being series connected to each other. The one or more electrical parameters of the resonant circuit includes a voltage at a node connecting a terminal of the resonant capacitor and a terminal of the resonant inductor, and a current passing through the resonant inductor.

The controller is configured to determine the voltage across the resonant capacitor, determine the voltage across the resonant inductor, and determine whether or not to adjust the switching frequency of the inverter based upon a difference between the voltage across the resonant capacitor and the voltage across the resonant inductor.

The controller is further configured to adjust the switching frequency of the inverter if the difference between the voltage across the resonant capacitor and the voltage across the resonant inductor exceeds a predetermined threshold value.

The controller is configured such that if the voltage across the resonant capacitor is greater than the voltage across the resonant inductor by at least the predetermined threshold value, the controller performs one of increasing and decreasing the switching frequency of the inverter by a predetermined amount. If the voltage across the resonant inductor is greater than the voltage across the resonant capacitor by at least the predetermined threshold value, the controller performs the other one of increasing and decreasing the switching frequency of the inverter by the predetermined amount. The controller is further configured to maintain the switching frequency of the inverter if the difference between the voltage across the resonant capacitor and the voltage across the resonant inductor is less than the predetermined threshold value.

In one implementation, the power supply is a DC power supply and the inverter includes a first switch connected between a positive terminal of the DC power supply and a first terminal of the resonant capacitor; and a second switch connected between the first terminal of the resonant capacitor and a negative terminal of the DC power supply. A control terminal of the first switch and a control terminal of the second switch are connected to the one or more outputs of the controller. The controller controls the first and second switches such that the second switch is turned off when the first switch is turned on, and the first switch is turned off when the second switch is turned on.

In another implementation, the inverter may further include a third switch connected between the positive terminal of the DC power supply and a terminal of the resonant inductor; and a fourth switch connected between the negative terminal of the DC power supply and the terminal of the resonant inductor. A control terminal of the third switch and a control terminal of the fourth switch are connected to the one or more outputs of the controller. The controller controls the third and fourth switches such that the third switch is turned on and off when the second switch is turned on and off, respectively, and the fourth switch is turned on and off when the first switch is turned on and off, respectively.

In still another implementation, the power supply is an AC power supply and the inverter includes a first switch connected between a first terminal of the AC power supply and a first terminal of the resonant capacitor; a second switch connected to the first terminal of the resonant capacitor; a third switch connected between a second terminal of the AC power supply and a first terminal of the resonant inductor; and a fourth switch connected between the second switch and the first terminal of the resonant inductor. The control terminal of each of the first, second, third and fourth switches is connected to the one or more outputs of the controller. The controller controls the first, second, third and fourth switches such that during a first half switching cycle, the first and fourth switches conduct while the second and third switches do not conduct. During a second half switching cycle, the second and third switches conduct while the first and forth transistors do not conduct.

According to another example embodiment, a wireless power transfer system includes an inverter having a pair of supply inputs for coupling to a power supply and one or more control inputs for receiving one or more control signals, the inverter including a resonant circuit having a resonant capacitor and a resonant inductor, and a switching circuit coupled to the supply inputs and the one or more control inputs for providing an alternating current to the resonant circuit. A receiver includes an inductor which forms inductive coupling with the resonant inductor of the resonant circuit and a rectifier connected to the inductor of the receiver, the receiver rectifying an AC signal to generate a DC output voltage at an output of the wireless power transfer system. A controller has one or more inputs which receive one or more signals corresponding to one or more electrical parameters of the resonant circuit and one or more outputs connected to the one or more control inputs of the inverter for providing the one or more control signals to the switching circuit of the inverter. The controller is configured to generate the one or more control signals, the one or more control signals controlling a switching frequency of the inverter based at least in part upon the one or more electrical parameters of the resonant circuit. The controller is configured to determine a voltage across the resonant capacitor, determine a voltage across the resonant inductor, and determine whether or not to adjust the switching frequency of the inverter based upon a difference between the voltage across the resonant capacitor and the voltage across the resonant inductor.

The controller is further configured to adjust the switching frequency of the inverter if the difference between the voltage across the resonant capacitor and the voltage across the resonant inductor exceeds a predetermined threshold value. The controller is configured such that if the voltage across the resonant capacitor is greater than the voltage across the resonant inductor by at least the predetermined threshold value, the controller performs one of increasing and decreasing the switching frequency of the inverter by a predetermined amount. If the voltage across the resonant inductor is greater than the voltage across the resonant capacitor by at least the predetermined threshold value, the controller performs the other one of increasing and decreasing the switching frequency of the inverter by the predetermined amount. If the difference between the voltage across the resonant capacitor and the voltage across the resonant inductor is less than the predetermined threshold value, the controller maintains the switching frequency of the inverter without change thereto.

In one implementation, the power supply is a DC power supply and the inverter includes a first switch connected between a positive terminal of the DC power supply and a first terminal of the resonant capacitor; and a second switch connected between the first terminal of the resonant capacitor and a negative terminal of the DC power supply. The control terminal of the first switch and a control terminal of the second switch are connected to the one or more outputs of the controller. The controller controls the first and second switches such that the second switch is turned off when the first switch is turned on, and the first switch is turned off when the second switch is turned on.

In another implementation, the inverter further includes a third switch connected between the positive terminal of the DC power supply and a terminal of the resonant inductor; and a fourth switch connected between the negative terminal of the DC power supply and the terminal of the resonant inductor. A control terminal of the third switch and a control terminal of the fourth switch are connected to the one or more outputs of the controller. The controller controls the third and fourth switches such that the third switch is turned on and off when the second switch is turned on and off, respectively, and the fourth switch is turned on and off when the first switch is turned on and off, respectively.

In another implementation, the power supply is an AC power supply and the inverter includes a first switch connected between a first terminal of the AC power supply and a first terminal of the resonant capacitor; and a second switch connected to the first terminal of the resonant capacitor; a third switch connected between a second terminal of the AC power supply and a first terminal of the resonant inductor; and a fourth switch connected between the second switch and the first terminal of the resonant inductor. A control terminal of each of the first, second, third and fourth switches is connected to the one or more outputs of the controller. The controller controls the first, second, third and fourth switches such that during a first half switching cycle, the first and fourth switches conduct while the second and third switches do not conduct, and during a second half switching cycle, the second and third switches conduct while the first and forth transistors do not conduct.

DETAILED DESCRIPTION

Figure 1A:
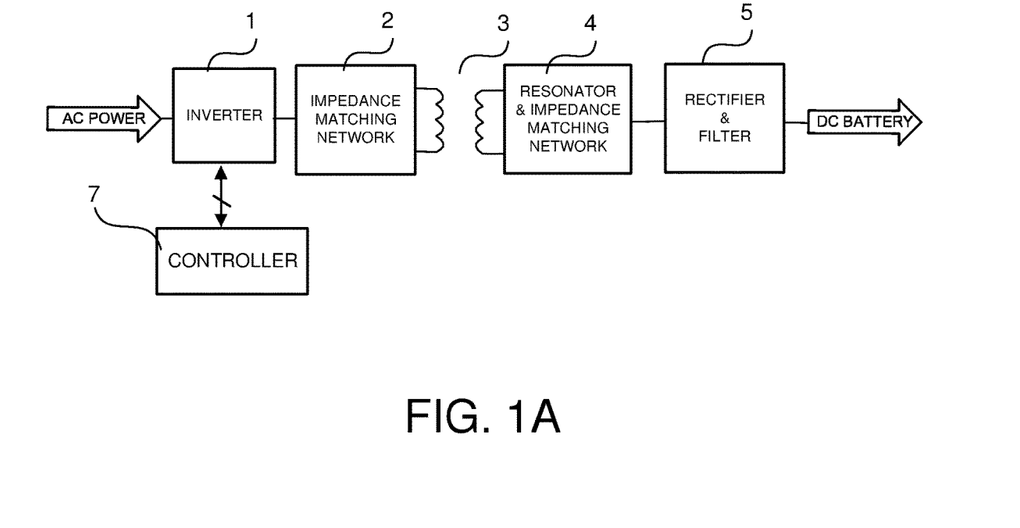
FIG. 1A is a representation of a wireless power transfer system utilizing an AC to AC scheme, according to an example embodiment.
Figure 1B:
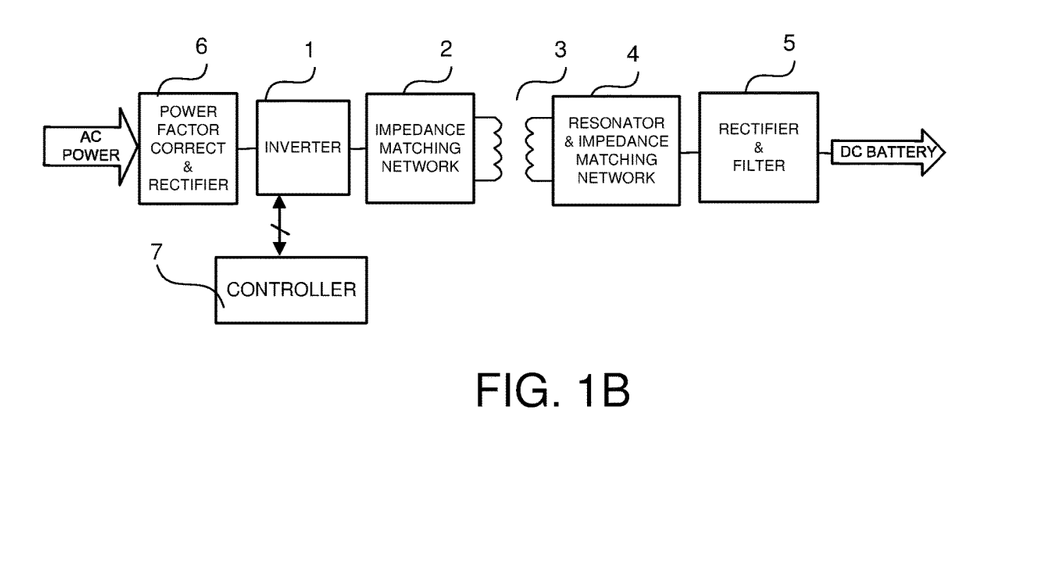
FIG. 1B is a representation of a wireless power transfer system utilizing a AC to DC scheme, according to an example embodiment.

Referring to FIG. 1A, a wireless power transfer system is shown that converts low frequency alternating current into high frequency alternating current (AC to AC), including an inverter 1, an impedance matching network 2, an inductive coupling 3 through free space, a receiver resonator and impedance matching network 4, and a rectifier and filter 5. A processor and/or controller 7 may generate output control signals for controlling inverter 1 based at least in part upon feedback signals received therefrom, as described in greater detail below. Referring to FIG. 1B, an additional functional block for power factor correction and rectification 6 is shown, to receive low frequency alternating current and convert it to direct current as an additional step or function necessary for a direct current to high frequency alternating current (DC to AC) wireless power transfer system. For simplicity, referring to FIGS. 1A and 1B, resonator and impedance matching network 4 as well as rectifier and filter 5 are combined into a receiver block 19 in FIGS. 2-4.

It is understood that inverter 1, impedance matching network 2, impedance matching network 4, and rectifier and filter 5 may be implemented, in whole or in part, in hardware and/or in software executed by at least one processor or controller. The rectifier of the rectifier and filter 5 block may be implemented in any of a number of ways, including as a half-wave rectifier, a full-wave rectifier, etc. It is understood that rectifiers, rectifiers with filters, resonators and impedance matching networks are very well known such that a description for them will not be provided for reasons of simplicity.

With reference to FIG. 1A, grid alternating current as an AC power is applied to inverter 1, which by use of semiconductor switches digitally sequenced under a control, converts the grid alternating current from a low frequency, 50/60 Hz in the case of European or North American power grid or 400 Hz port/aviation power grid for example, to a high frequency alternating voltage, 85 kHz as in SAE J2954 standard or frequencies allotted in ITU Treaty and Title 47 FCC ISM (Industrial, Scientific, and Medical) or ETSI EN 303 417 standard or other high frequency greater than 10 kHz, for example.

With reference to FIG. 1B, grid alternating current as an AC power is applied to a power factor correction and rectification functionality 6, which by use of some combination of semiconductor switches, diodes and electrical components such as capacitors and inductors converts the grid alternating current from a low frequency, 50/60 Hz in the case of European or North American power grid or 400 Hz port/aviation power grid for examples, to a DC power with fixed polarity of voltage. This DC power is applied to an inverter 1, which by use of semiconductor switches digitally sequenced under a control by controller 7, converts the direct current to a high frequency alternating voltage, 85 kHz as in SAE J2954 standard or frequencies allotted in ITU Treaty and Title 47 FCC ISM (Industrial, Scientific, and Medical) or ETSI EN 303 417 standard or other high frequency greater than 10 kHz, for example.

Figure 2:
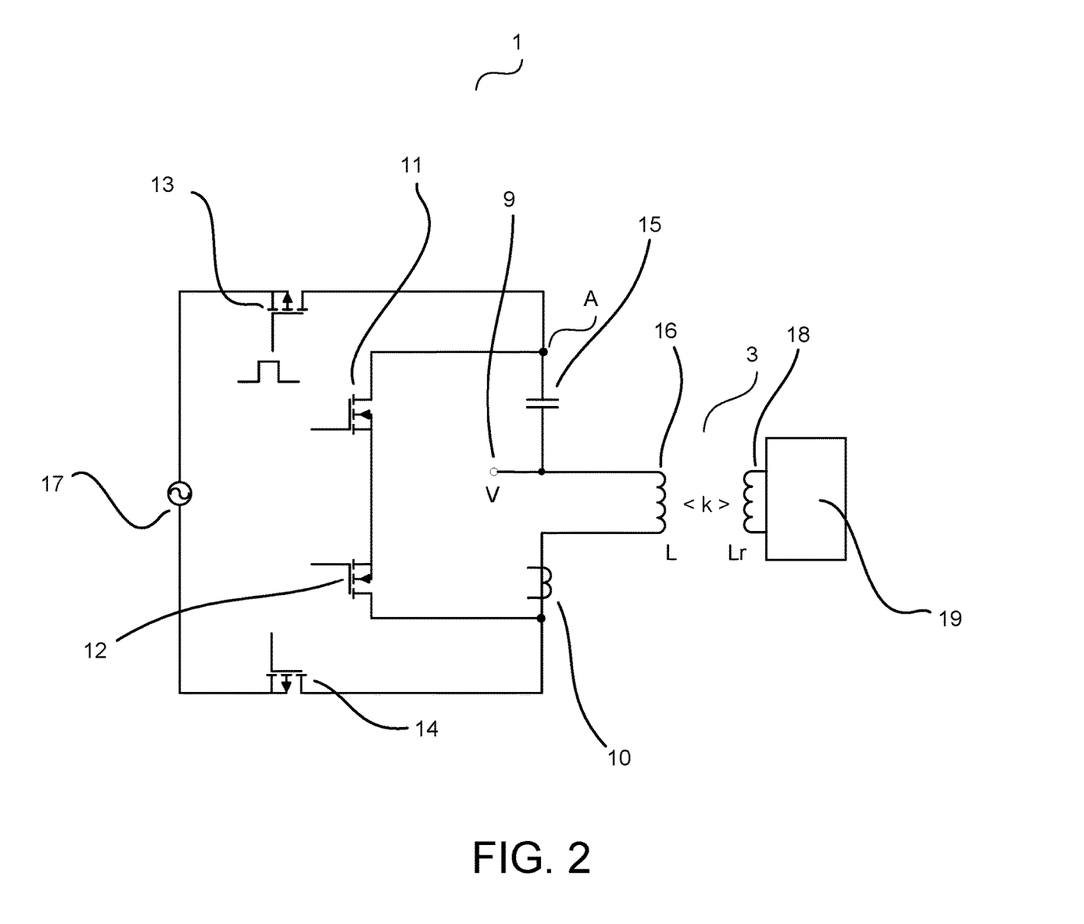
FIG. 2 is a simplified schematic of an AC to AC converter forming at least part of the wireless power transfer system of FIG. 1A, according to an example embodiment.
Figure 3:
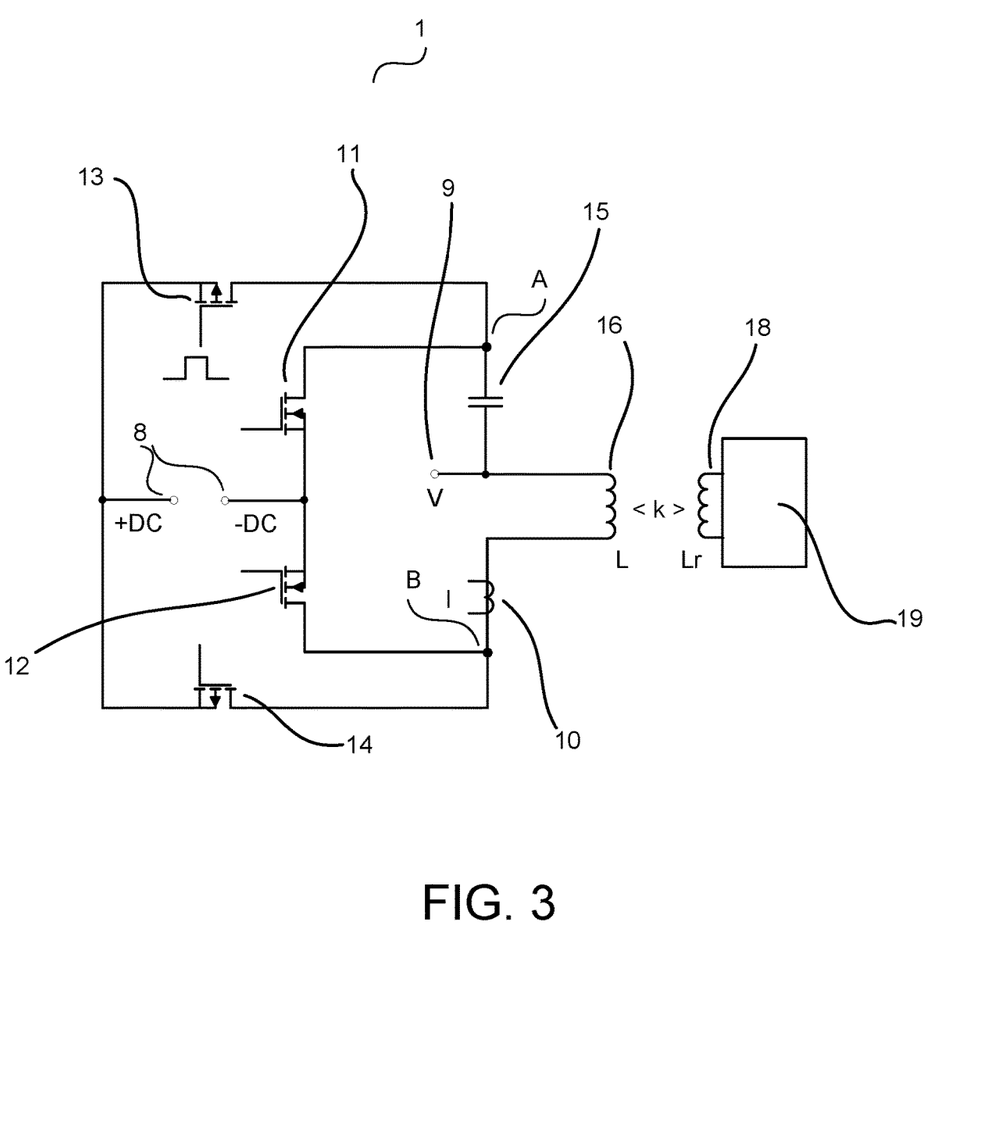
FIG. 3 is a simplified schematic of a DC to AC converter forming at least part of the wireless power transfer system of FIG. 1B, according to an example embodiment.
Figure 4:
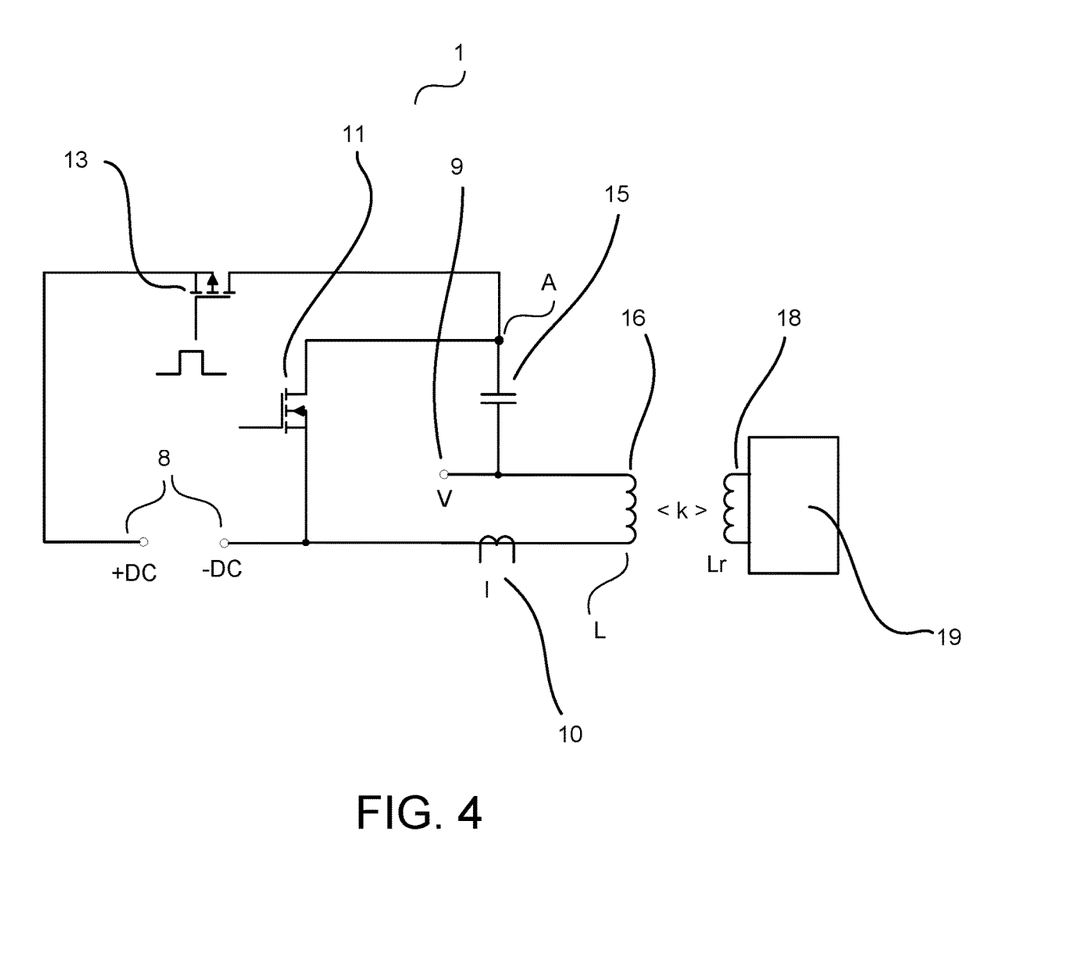
FIG. 4 is a simplified schematic of a DC to AC converter forming at least part of the wireless power transfer system of FIG. 1B, according to another example embodiment.

The high frequency alternating voltage is presented to a transmitter antenna tuning and coupling unit which may include impedance matching network 2 and inductive coupling 3. Across the coupling 3, power is transferred to a receiver antenna tuning and coupling unit which may include resonator and impedance matching network 4. The output of the receiver then may be provided to rectifier and filter 5 that converts the high frequency alternating current into a direct current which may be used to charge a DC battery, or may be used to charge another type of energy storage element, such as capacitor or fly-wheel. FIGS. 2, 3, and 4 show examples of inverter 1, with inductive coupling 3 that includes a transmitter inductive coil 16 and a receiving inductive coil 18 with a coupling coefficient k therebetween. Optional for control is the measurement of current 10 into the series resonator. The resonator and impedance matching network 4, rectifier and filter 5, and any energy storage element are combined into a receiver block 19 for the sake of simplicity, as stated above.

With reference to FIG. 2, an AC to AC inverter 1 is shown connected to an AC source 17 for providing an alternating current thereto. Inverter 1 includes a bridge of semiconductor switches 11, 12, 13, and 14 feeding a series resonant circuit including a resonator capacitor 15 and resonant inductor 16 which itself forms part of inductive coupling 3. Switches 11 and 12 are illustrated as n-channel MOSFET transistors and switches 13 and 14 are illustrated as p-channel MOSFET transistors, but it is understood that switches 11-14 may be implemented with other types of transistors. As shown, the source terminal of switch 13 is connected to one terminal of AC source 17 and the source terminal of switch 14 is connected to the other terminal of AC source 17. The drain terminal of switch 13 is connected to the drain terminal of switch 11 and a terminal of resonant capacitor 15, and the drain terminal of switch 14 is connected to the source terminal of switch 12 and is coupled to resonant inductor 16. A current transformer 10 is disposed in series with resonant capacitor 15 and resonant inductor 16 and particularly between resonant inductor 16 and switches 12 and 14, as shown in FIG. 2. Controller 7 may include inputs for receiving electrical parameters associated with sample point 9 and current transformer 10 with which to determine voltages of the series resonant circuit. Controller 7 may also include outputs which provide control signals for controlling inverter 1. The control (gate) terminals of switches 11-14 are connected to the outputs of controller 7 for receiving these control signals from controller 7, as described in greater detail below.

The current of the series resonant circuit flows alternatingly at high frequency through resonant capacitor 15, switch 11, switch 12, and resonant inductor 16. In one control strategy by which controller 7 is configured, while clocked and switching at the high frequency, switch 13 conducts during the positive half cycle of the incoming alternating current while switch 11 does not conduct. Specifically, during the positive half cycle, when the current of the resonant circuit is positive, switches 13 and 11 are turned on; and when the current of the resonant circuit is negative, switch 13 is turned off and switches 11 and 12 are turned on. Then switch 14 conducts during the negative half cycle of the alternating current and switch 12 does not conduct. Specifically, during the negative half cycle, when the current of the resonant circuit is negative, switches 12 and 14 are turned on; and when the resonant circuit current is positive, switch 14 is turned off and switches 11 and 12 are turned on. Voltage between sample point 9 and the node A to which a terminal of resonant capacitor 15, the drain terminal of switch 11 and the drain terminal of switch 13 are connected is the voltage across the resonant capacitor 15. The voltage between sample point 9 and a terminal of resonant inductor 16, to which switches 12 and 14 are connected via current transformer 10, is the voltage across the resonant inductor 16.

With reference to FIG. 3, a DC to AC inverter 1 is shown, with inputs 8 for connecting to a DC supply (not shown) and receiving a direct current therefrom. The DC supply is applied to a bridge of semiconductor switches 11, 12, 13, and 14, feeding a series resonant circuit including a resonator capacitor 15 and resonant inductor 16. The positive terminal of the DC supply connects to the source terminals of switches 13 and 14, and the negative terminal of the DC supply connects to the source terminal of switch 11 and the drain terminal of switch 12. The current of the resonant circuit current flows alternatingly at high frequency through resonant capacitor 15, switch 11, switch 12, and resonant inductor 16. In one control strategy which controller 7 is configured to perform, while clocked and switching at the high frequency, switch 13 conducts while switch 11 does not. Then when conduction cycle of switch 13 ends, switch 14 begins conducting and switch 12 does not. Thereby switch 13 conducts primarily when switch 12 conducts, and alternatively switch 14 conducts primarily when switch 11 conducts. The voltage between sample point 9 and the node A connecting the terminal of resonant capacitor 15, switch 11 and switch 13 is the voltage across the resonant capacitor 15. The voltage between sample point 9 and the node B connecting the terminal of resonant inductor 16 and current transformer 10 (to which switches 12 and 14 are connected via current transformer 10) is the voltage across the resonant inductor 16.

With reference to FIG. 4, a DC to AC inverter 1 is shown, with inputs 8 for connecting to a DC supply (not shown). When the inverter 1 is connected to a DC supply, the source terminal of switch 13 is connected to the positive terminal of the DC supply and the source terminal of switch 11 (as well as a terminal of current transformer 10) is connected to the negative terminal of the DC supply. The direct current from the DC supply, applied to a half-bridge of semiconductor switches 11 and 13, feeds the series resonant circuit including resonator capacitor 15 and resonant inductor 16. The current of the resonant circuit flows alternately at high frequency through resonant capacitor 15, switch 11, and resonant inductor 16. In one control strategy which controller 7 is configured to perform, while clocked and switching at the high frequency, switch 13 conducts while switch 11 does not, and switch 11 conducts when switch 13 does not. The voltage between sample point 9 and the node A connecting capacitor 15, the source terminal of switch 11 and the drain terminal of switch 13 is the voltage across the resonant capacitor 15. The voltage between sample point 9 and the node connecting resonant inductor 16, the negative terminal 8 of the DC supply, and the drain of switch 11 is the voltage across the resonant inductor L 16.

With reference to the inverters 1 of FIGS. 2-4, the voltage across the resonant capacitor 15 and the voltage across the resonant inductor 16 are measured as voltage values and these values are driven, as part of a control method performed by controller 7 through the adjustment of the inverter switching frequency, to be substantially equal in value. If the voltage values are different by some amount, then a decision is made based on that difference to change the frequency to a higher or lower frequency. The substantial equality of the voltage values is maintained to maintain a desired switching frequency and thereby the enhanced or otherwise optimized operation of the series resonator.

Figure 5:
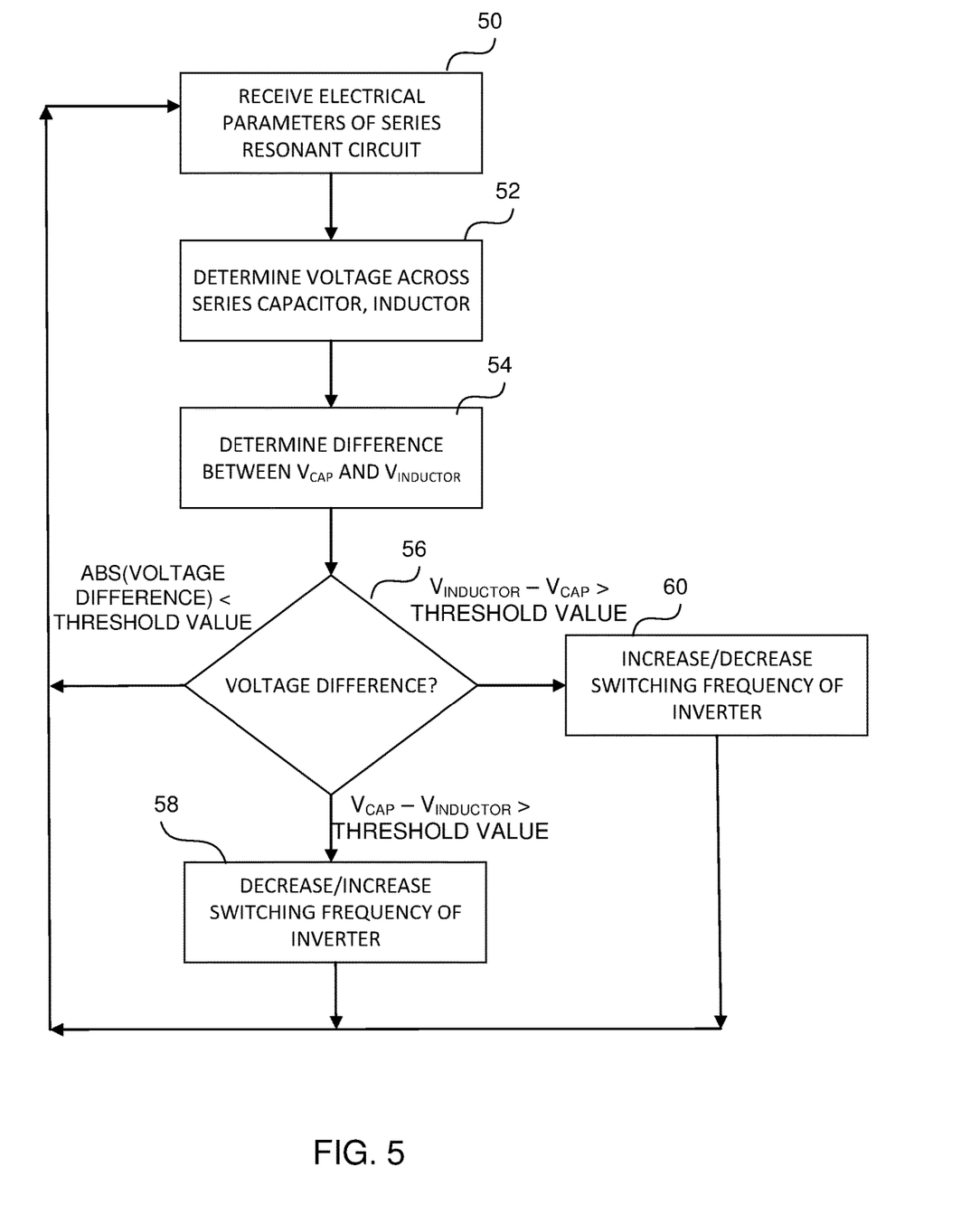
FIG. 5 is a flowchart illustrating a control method which controller is configured to perform according to an example embodiment.

FIG. 5 is a flowchart illustrating a control method which controller 7 is configured to perform according to an example embodiment. Controller 7 receives at 50 electrical parameters associated with the series resonant circuit. This may be performed by sampling the series resonant circuit. The electrical parameters may include the voltage and/or current associated with sample point 9 and the voltage and/or current associated with current transformer 10, for example. Controller 7 then determines at 52 the voltage across resonant capacitor 15 and the voltage across resonant inductor 16 of the series resonant circuit. These voltages may be peak, mean or rectified voltages, as determined by controller 7. At 54, controller determines a difference between the voltage across resonant capacitor 15 and the voltage across resonant inductor 16. A decision is then made at 56 whether or not to adjust the switching frequency of inverter 1 based upon the voltage difference determined at 54. Specifically, if the voltage difference between the voltage across resonant capacitor 15 and resonant inductor 16 is less than a predetermined threshold value, then controller 7 does not adjust the switching frequency. If the voltage across the resonant capacitor 15 is greater than the voltage across the resonant inductor 16, then controller 7 performs one of increasing and decreasing the switching frequency of inverter 1 by a predetermined step amount at 58. If the voltage across the resonant inductor 16 is greater than the voltage across the resonant capacitor 15, then controller 7 performs the other one of increasing and decreasing the switching frequency of inverter 1 by the predetermined step amount at 60. By repeatedly performing the operation illustrated in FIG. 5, controller 7 is able to maintain the voltages across series capacitor 15 and series inductor 16 to be equal or near equal so that the resonant frequency of the series resonant circuit is obtained, which results in improved efficiency of the wireless power transfer systems of FIGS. 1A and 1B.

Various embodiments may be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

It is to be understood that the type and plurality of semiconductor switches, type and plurality of reactive components, and means by which resonant component voltage parameters are measured and interpreted voltage values are established should not depart from the scope and spirit of the invention. It is to be understood that the embodiments shown and described herein are only illustrative of the principles of the present invention and that various modifications may be implemented by those skilled in the art without departing from the scope and spirit of the invention.

What is claimed is:

1. A wireless power transfer system, comprising:
   an inverter having a pair of supply inputs for coupling to a power supply and one or more control inputs for receiving one or more control signals, the inverter including a resonant circuit having a resonant capacitor and a resonant inductor, and a switching circuit coupled to the supply inputs and the one or more control inputs for providing an alternating current to the resonant circuit; and
   a receiver comprising an inductor which forms inductive coupling with the resonant inductor of the resonant circuit and a rectifier connected to the inductor of the receiver, the receiver rectifying an AC signal to generate a DC output voltage at an output of the wireless power transfer system; and
   a controller having one or more inputs which receive one or more signals corresponding to one or more electrical parameters of the resonant circuit and one or more outputs connected to the one or more control inputs of the inverter for providing the one or more control signals to the switching circuit of the inverter, the controller configured to generate the one or more control signals, the one or more control signals controlling a switching frequency of the inverter based at least in part upon the one or more electrical parameters of the resonant circuit so that a voltage across the resonant capacitor and a voltage across the resonant inductor are maintained within a predetermined voltage range of each other.

2. The wireless power transfer system of claim 1, wherein the resonant circuit comprises a series resonant circuit, the resonant capacitor and the resonant inductor being series connected to each other.

3. The wireless power transfer system of claim 2, wherein the one or more electrical parameters of the resonant circuit comprises a voltage at a node connecting a terminal of the resonant capacitor and a terminal of the resonant inductor, and a current passing through the resonant inductor.

4. The wireless power transfer system of claim 1, wherein the controller is configured to determine the voltage across the resonant capacitor, determine the voltage across the resonant inductor, and determine whether or not to adjust the switching frequency of the inverter based upon a difference between the voltage across the resonant capacitor and the voltage across the resonant inductor.

5. The wireless power transfer system of claim 4, wherein the controller is further configured to adjust the switching frequency of the inverter if the difference between the voltage across the resonant capacitor and the voltage across the resonant inductor exceeds a predetermined threshold value.

6. The wireless power transfer system of claim 5, wherein the controller is configured such that if the voltage across the resonant capacitor is greater than the voltage across the resonant inductor by at least the predetermined threshold value, the controller performs one of increasing and decreasing the switching frequency of the inverter by a predetermined amount.

7. The wireless power transfer system of claim 6, wherein the controller is configured such that if the voltage across the resonant inductor is greater than the voltage across the resonant capacitor by at least the predetermined threshold value, the controller performs the other one of increasing and decreasing the switching frequency of the inverter by the predetermined amount.

8. The wireless power transfer system of claim 5, wherein the controller is further configured to maintain the switching frequency of the inverter if the difference between the voltage across the resonant capacitor and the voltage across the resonant inductor is less than the predetermined threshold value.

9. The wireless power transfer system of claim 1, wherein the power supply comprises a DC power supply and the inverter comprises:

a first switch connected between a positive terminal of the DC power supply and a first terminal of the resonant capacitor; and a second switch connected between the first terminal of the resonant capacitor and a negative terminal of the DC power supply, wherein a control terminal of the first switch and a control terminal of the second switch are connected to the one or more outputs of the controller and the controller controls the first and second switches such that the second switch is turned off when the first switch is turned on, and the first switch is turned off when the second switch is turned on.

10. The wireless power transfer system of claim 9, wherein the inverter further comprises:

a third switch connected between the positive terminal of the DC power supply and a terminal of the resonant inductor; and a fourth switch connected between the negative terminal of the DC power supply and the terminal of the resonant inductor, wherein a control terminal of the third switch and a control terminal of the fourth switch are connected to the one or more outputs of the controller and the controller controls the third and fourth switches such that the third switch is turned on and off when the second switch is turned on and off, respectively, and the fourth switch is turned on and off when the first switch is turned on and off, respectively.

11. The wireless power transfer system of claim 1, wherein the power supply comprises an AC power supply and the inverter comprises:

a first switch connected between a first terminal of the AC power supply and a first terminal of the resonant capacitor; and a second switch connected to the first terminal of the resonant capacitor;

a third switch connected between a second terminal of the AC power supply and a first terminal of the resonant inductor; and a fourth switch connected between the second switch and the first terminal of the resonant inductor, wherein a control terminal of each of the first, second, third and fourth switches is connected to the one or more outputs of the controller and the controller controls the first, second, third and fourth switches such that
during a first half switching cycle, the first and fourth switches conduct while the second and third switches do not conduct, and
during a second half switching cycle, the second and third switches conduct while the first and fourth transistors do not conduct.

12. A wireless power transfer system, comprising:
an inverter having a pair of supply inputs for coupling to a power supply and one or more control inputs for receiving one or more control signals, the inverter including a resonant circuit having a resonant capacitor and a resonant inductor, and a switching circuit coupled to the supply inputs and the one or more control inputs for providing an alternating current to the resonant circuit; and
a receiver comprising an inductor which forms inductive coupling with the resonant inductor of the resonant circuit and a rectifier connected to the inductor of the receiver, the receiver rectifying an AC signal to generate a DC output voltage at an output of the wireless power transfer system; and
a controller having one or more inputs which receive one or more signals corresponding to one or more electrical parameters of the resonant circuit and one or more outputs connected to the one or more control inputs of the inverter for providing the one or more control signals to the switching circuit of the inverter, the controller configured to generate the one or more control signals, the one or more control signals controlling a switching frequency of the inverter based at least in part upon the one or more electrical parameters of the resonant circuit.

13. The wireless power transfer system of claim 12, wherein the controller is configured to determine a voltage across the resonant capacitor, determine a voltage across the resonant inductor, and determine whether or not to adjust the switching frequency of the inverter based upon a difference between the voltage across the resonant capacitor and the voltage across the resonant inductor.

14. The wireless power transfer system of claim 13, wherein the controller is further configured to adjust the switching frequency of the inverter if the difference between the voltage across the resonant capacitor and the voltage across the resonant inductor exceeds a predetermined threshold value.

15. The wireless power transfer system of claim 14, wherein the controller is configured such that
if the voltage across the resonant capacitor is greater than the voltage across the resonant inductor by at least the predetermined threshold value, the controller performs one of increasing and decreasing the switching frequency of the inverter by a predetermined amount,
if the voltage across the resonant inductor is greater than the voltage across the resonant capacitor by at least the predetermined threshold value, the controller performs the other one of increasing and decreasing the switching frequency of the inverter by the predetermined amount, and
if the difference between the voltage across the resonant capacitor and the voltage across the resonant inductor is less than the predetermined threshold value, the controller maintains the switching frequency of the inverter without change thereto.

16. The wireless power transfer system of claim 12, wherein the power supply comprises a DC power supply and the inverter comprises:
a first switch connected between a positive terminal of the DC power supply and a first terminal of the resonant capacitor; and
a second switch connected between the first terminal of the resonant capacitor and a negative terminal of the DC power supply,
wherein a control terminal of the first switch and a control terminal of the second switch are connected to the one or more outputs of the controller and the controller controls the first and second switches such that the second switch is turned off when the first switch is turned on, and the first switch is turned off when the second switch is turned on.

17. The wireless power transfer system of claim 16, wherein the inverter further comprises:
a third switch connected between the positive terminal of the DC power supply and a terminal of the resonant inductor; and a fourth switch connected between the negative terminal of the DC power supply and the terminal of the resonant inductor, wherein a control terminal of the third switch and a control terminal of the fourth switch are connected to the one or more outputs of the controller and the controller controls the third and fourth switches such that the third switch is turned on and off when the second switch is turned on and off, respectively, and the fourth switch is turned on and off when the first switch is turned on and off, respectively.

18. The wireless power transfer system of claim 12, wherein the power supply comprises an AC power supply and the inverter comprises:

a first switch connected between a first terminal of the AC power supply and a first terminal of the resonant capacitor; and a second switch connected to the first terminal of the resonant capacitor;

a third switch connected between a second terminal of the AC power supply and a first terminal of the resonant inductor; and a fourth switch connected between the second switch and the first terminal of the resonant inductor, wherein a control terminal of each of the first, second, third and fourth switches is connected to the one or more outputs of the controller and the controller controls the first, second, third and fourth switches such that during a first half switching cycle, the first and fourth switches conduct while the second and third switches do not conduct, and during a second half switching cycle, the second and third switches conduct while the first and fourth transistors do not conduct.

* * * * *